Patented Apr. 4, 1944

2,345,585

UNITED STATES PATENT OFFICE 2,345,585

HYDRAULIC FLUID

John M. Clark and Ralph E. Van Deventer, Detroit, Mich., assignors to Packard Motor Car Company, Detroit, Mich., a corporation of Michigan No Drawing. Application August 3, 1940, Serial No. 351,102

3 Claims. (Cl. 252—73)

This invention relates to compositions of matter and more especially to fluids which are adapted to be used in hydraulic apparatus for the transmission of power.

Such fluids are often subjected to extreme temperature variations and must be so constituted that they retain a relatively invariable viscosity, a homogeneous texture, and resist decomposition, solidification, and separation of the ingredients throughout the temperature range to which they are exposed.

Particularly difficulty has been encountered in maintaining a one-phase composition in hydraulic fluids which contain castor oil when the fluids are subjected to wide temperature variations, since the composition of the oil includes compounds which will separate from the remainder of the fluid when it is allowed to stand for a prolonged period at low temperatures.

Castor oil is a mixture of several glyceryl esters of fatty acids, chiefly ricinoleic acid, also palmitic, oleic, and stearic acids and some free fatty acid. The melting points of the glycerine esters of stearic and ricinoleic acid are considerably higher than those of the other esters and this property causes these esters to solidify and separate from the other constituents causing an undesirable change in the hydraulic fluid when it is subjected to low temperatures, which are, however, considerably above those at which the remaining constituents are so affected.

One object of the present invention is to provide a hydraulic fluid containing castor oil which is not affected by extreme temperature variations and especially will not exhibit any tendency to form a precipitate at low temperatures.

A further object is the provision of a process for producing a hydraulic fluid which will remain clear at all temperatures, which process facilitates the solution of the different ingredients, materially decreasing the time and difficulty usually involved in forming such compositions.

Hydraulic fluids of the type with which this invention is concerned may vary widely in composition. The castor oil is generally dissolved in organic solvents and diluents or mixtures of them such as methanol, propanol, isopropanol, butanol, isobutanol, acetone, ethylene, propylene glycols, and other glycols, and some ketones and hydrocarbons. Compounds which impart lubrication qualities such as deflocculated graphite and metal soaps, and compounds which inhibit the corrosive effect of the fluid such as toluidines, alkalis, soap, di- or tri-ethanolamine, and glycols which reduce the corrosive effect of the alcohols on rubber are also added to the solution of the castor oil in necessary quantities.

The viscosity and other characteristics of the final fluid can be controlled by the relative proportions of the ingredients. A satisfactory range of ingredients in accordance with the present invention includes 15% to 50% castor oil, 2% to 50% propylene glycol, 10% to 70% butanol or isobutanol, and an amount of potassium hydroxide which varies directly with the amount of the castor oil. The compositions of representative fluids are illustrated in the following chart:

| Castor oil (by volume) | 33 | 50 | 35 | 30 | 25 | 40 | 20 |
|---|---|---|---|---|---|---|---|
| Propylene glycol (by volume) | 12 | 10 | 15 | 15 | 25 | 10 | 20 |
| Isobutanol (by volume) | 55 | 40 | 50 | 55 | 50 | 50 | 60 |
| Potassium hydroxide (oz. per gal. castor oil) | .15 to .8 oz. | | | | | | |

It is obvious that in the foregoing chart other glycols such as ethylene, nonaethylene, hexaethylene, and tetraethylene may be substituted for the propylene glycol and alcohols such as butanol, propanol, and isopropanol may be substituted for the isobutanol.

In accordance with the present invention, the higher melting fats found in the castor oil, and particularly the tristearine and triricinolein, are prevented from precipitating out of the finished fluid at low temperatures, by converting the same, during processing, into a form in which they will remain in solution regardless of temperature variations. This is accomplished by heating the solution to cause the alcohol in the composition to combine chemically with the higher melting fats to form corresponding lower melting esters. The presence of a strong alkali such as potassium, sodium, lithium, or calcium hydroxide, is necessary to the reaction and it should be noted that weaker alkalis and organic amines, as triethanolamine, methylamine, and propylamine, are ineffectual. The alkali which is added is completely neutralized when the reaction is complete, having been depleted by reaction with the free fatty acid.

The preferred method of the invention involves introducing the proper proportions of castor oil and glycol to a suitable heating tank, together with the alkali, the amount of which is determined by the amount of the castor oil used. The alkali is added in the form of an alcoholic solution which is made with a small portion of the alcohol which is to be incorporated in the fluid. This mixture is then heated at 180° to 220° F. with constant agitation for 15 to 20 minutes, at the end of which time the alkali should be neutralized. This point can be determined by any standard indicator reacting in alkaline solution, such as phenol-phthalein. The heating is then discontinued and the remaining alcohol is added and the agitation continued until the mixture is homogeneous.

The time and temperature of the reaction vary inversely, and both depend somewhat on the degree of agitation. The most satisfactory temperature has been found to be about 200° F. At this temperature the reaction proceeds quickly and the loss of the solution due to evaporation is not substantial. The heating also serves to aid the solution of the castor oil in the glycol.

When the mixture is complete the fluid is removed from the heating tank and run through a fine mesh strainer to remove foreign particles. It is then cooled and placed in containers ready for use.

The following example illustrates the process specifically.

Thirty-three gallons of castor oil, 12 gallons of propylene glycol, and 25 ounces of KOH dissolved in 2 gallons of isobutanol are introduced into a heating tank and heated with agitation to 200° F. until the solution is neutral to phenolphthalein. Fifty-five gallons of isobutanol are then added and the agitation continued until the solution is homogeneous. It is then strained, cooled, and placed in containers.

While we do not desire to be bound by any theory as to the exact reactions which occur, it is believed that the tristearine and triricinolein of the castor oil are converted to lower-melting esters by replacement of the glycerol radical with the isobutyl or other radical of the alcohol used, or a partially esterified product containing both radicals is produced, the soap formed by the reaction of the alkali and the castor oil serving as a catalyst in such conversion reaction.

Various modifications and substitutions other than those specifically described and mentioned are contemplated and may be made without departing from or sacrificing any of the advantages of the present invention.

Having thus described the invention, what is claimed as new and desired to be secured by Letters Patent is:

1. The method of making a hydraulic fluid comprising heating at from about 180° F. to about 220° F., a mixture of castor oil and a glycol in the proportions of from one to five parts castor oil to one part of glycol, in the presence of a strong alkaline catalyst dissolved in a quantity of a monohydric alcohol, and then adding more of said monohydric alcohol until the whole amount of said monohydric alcohol is from about 10% to about 70% of all of the ingredients.

2. An hydraulic fluid consisting essentially of the reaction product obtained by heating castor oil, propylene glycol, and isobutyl alcohol in the presence of an alkaline catalyst.

3. The method of making an hydraulic fluid which comprises heating to a temperature of from about 180° F. to about 220° F. a mixture of castor oil with a substantially less amount by volume of propylene glycol and isobutanol, in the presence of a strongly alkaline catalyst, the latter being introduced in solution in the isobutanol, continuing the reaction until the alkali is neutralized, and thereafter adding isobutanol in amount sufficient to bring the total quantity of isobutanol introduced to not substantially less than the total of the remaining ingredients.

JOHN M. CLARK.
RALPH E. VAN DEVENTER.